(12) United States Patent
Ludenia

(10) Patent No.: US 7,342,492 B2
(45) Date of Patent: Mar. 11, 2008

(54) ELECTRICAL APPLIANCE

(75) Inventor: Thomas Ludenia, Falkensee (DE)

(73) Assignee: BSH Bosch und Siemens Hausgeraete GmbH, Munich (DE)

(*) Notice: Subject to any disclaimer, the term of this patent is extended or adjusted under 35 U.S.C. 154(b) by 142 days.

(21) Appl. No.: 11/058,082

(22) Filed: Feb. 10, 2005

(65) Prior Publication Data
US 2005/0212652 A1    Sep. 29, 2005

Related U.S. Application Data

(63) Continuation of application No. PCT/EP03/07263, filed on Jul. 3, 2003.

(30) Foreign Application Priority Data
Aug. 12, 2002   (DE) .............................. 102 36 937

(51) Int. Cl.
    G08B 21/00   (2006.01)
(52) U.S. Cl. .................. 340/540; 340/517; 340/691.8; 200/308
(58) Field of Classification Search ..................... None
    See application file for complete search history.

(56) References Cited

U.S. PATENT DOCUMENTS

| 4,535,254 | A | * | 8/1985 | Khatri ........................ 307/38 |
| 4,894,527 | A | * | 1/1990 | Smith .................... 250/214 AL |
| 5,464,955 | A | * | 11/1995 | Cole ......................... 200/317 |
| 5,546,071 | A |   | 8/1996 | Zdunich |
| 5,619,185 | A | * | 4/1997 | Ferraro ..................... 340/568.2 |
| 5,675,150 | A |   | 10/1997 | Kunz |
| 5,698,826 | A | * | 12/1997 | Cracraft et al. ............. 200/5 A |
| 5,789,869 | A | * | 8/1998 | Lo et al. ..................... 315/159 |
| 5,884,254 | A | * | 3/1999 | Ucar .......................... 704/231 |
| 5,973,608 | A | * | 10/1999 | McMahon .................... 341/33 |
| 6,246,397 | B1 | * | 6/2001 | Vossler ....................... 345/204 |
| 6,501,515 | B1 | * | 12/2002 | Iwamura ..................... 348/734 |
| 6,713,975 | B2 | * | 3/2004 | Yamauchi et al. .......... 315/308 |
| 6,970,824 | B2 | * | 11/2005 | Hinde et al. ............. 704/270.1 |
| 2002/0038553 | A1 |   | 4/2002 | Yun et al. |
| 2003/0025676 | A1 | * | 2/2003 | Cappendijk ................. 345/173 |

(Continued)

FOREIGN PATENT DOCUMENTS

DE         43 33 442 A1    4/1995

(Continued)

OTHER PUBLICATIONS

International Search Report

Primary Examiner—Benjamin C. Lee
Assistant Examiner—Son Tang
(74) Attorney, Agent, or Firm—Russell W. Warnock; James E. Howard

(57) ABSTRACT

A device 15, 2 to 6 and 10 to 14 for controlling appliance functions and for communicating with a user need not stay switched on during the entire operating time. These mostly include optical indicating means 10 to 14 whose lifetime can be increased if a motion detector 19 is arranged on the household appliance and is operatively connected to the device 15 for controlling and/or the device 2 to 6, 10 to 14 for communicating and if the device 10 to 14 for communicating can only be switched to active on receiving a signal from the motion detector 19.

20 Claims, 1 Drawing Sheet

U.S. PATENT DOCUMENTS

2003/0161490 A1* 8/2003 Maase ................. 381/110

FOREIGN PATENT DOCUMENTS

| DE | 196 06 115 | A1 | 8/1996 |
| DE | 197 46 188 | A1 | 4/1999 |
| DE | 198 16 749 | A1 | 10/1999 |
| EP | 0 976 862 | B1 | 10/2004 |

* cited by examiner

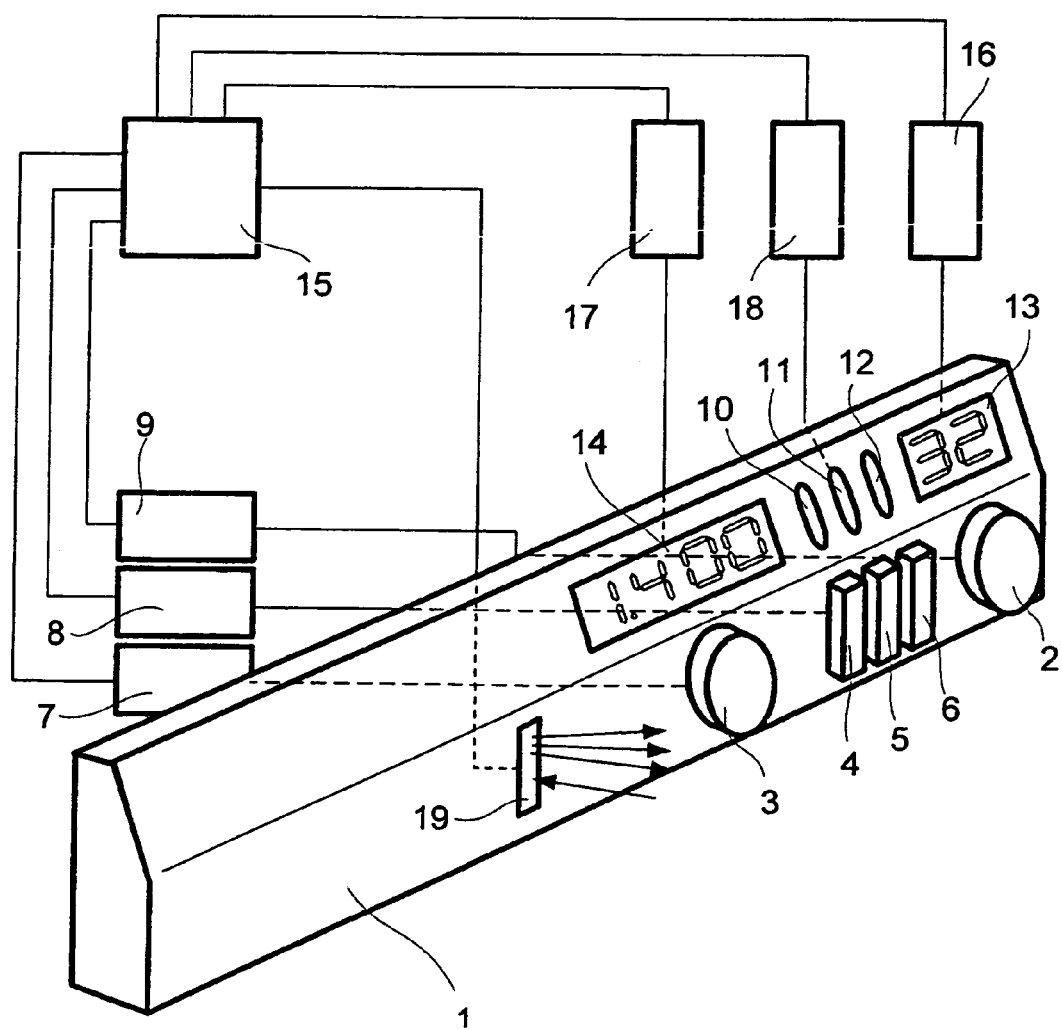

ELECTRICAL APPLIANCE

BACKGROUND OF THE INVENTION

The invention relates to an electrical household appliance with a device for controlling appliance functions and with a device for communicating with a user.

Modern household appliances are fitted with an optical indicating device, especially a display, which displays program-related information in clear text to the user, that is information on the program and the program sequence. The indication in the display should make it easier for the user to program the household appliance so that if possible a description of the appliance or operating instructions can be dispensed with.

Such a display is described in DE 196 06 115 A1. According to this, a plurality of displays for outputting information in clear text are arranged in the control panel of a baking oven. Each display is allocated a special function. As a result, the displays are presented more clearly.

A comparable device is known from DE 198 34 230 A1 in which control elements for the program parameters respectively specified in the display are allocated to a clear text display.

Common to all such operating and indicating devices, also known as communication devices, as well as general devices for illumination on household appliances is that at least during operation of the household appliance but also during its non-use in so-called standby mode, they use electrical energy which is without any effect as long as no user takes note thereof. In addition, the continuous illumination of indicating means has a troublesome effect on some users.

SUMMARY OF THE INVENTION

It is the object of the invention to provide a device in which the indicating elements as well as other illuminating devices and signal output devices are always only activated when a user is to receive information from the information content of the display, output or the illumination.

In an electrical household appliance of the type specified initially this object is solved by the fact that a motion detector is arranged on the household appliance and is operatively connected to the device for controlling and/or the device for communicating and that the device for communicating can only be switched to active on receiving a signal from the motion detector.

As a result of the intervention of the motion detector, any unnecessary switching on of the communication devices is avoided. At the same time, a significant increase in the lifetime of the relevant illuminants or indicating displays is associated therewith.

If according to an advantageous embodiment of the invention, the motion detector is an infrared signal receiver, the additional expenditure for switching on of the indicating device or illumination according to the invention only when a person is approaching is kept within very narrow limits.

As a result of the fact that the infrared signal receiver is used for the motion detector, it is eliminated that in contrast to ultrasound signal receivers, the emission of any foreign acoustic signal can activate the indicating or illuminating device.

The motion detector is advantageously a sensor which reacts to changes in signal.

In a particularly advantageous further development of the invention, a timer is activated by the motion detector by which means the switch-on time for the communication device and/or the control device can be set. Then, according to the setting of the time, the communication or control device remains switched on until the system can expect that a persistent lack of movement means the absence of any possible user.

The timer is set, that is the switch-on time begins, only when there is a combination of movement of a person and a subsequent usage action. In this case, it is awaited whether this usage action is recorded within a pre-determined time interval after activation of the motion detector signal. Otherwise, neither the communication device is switched on nor is the timer set.

A sensor which has a directional characteristic for the radiation selected by it, especially the infrared radiation, is especially suitable. As a result of such a directional characteristic, it is achieved that the sensor only brings about the switching on of the communication device when the infrared source or the source emitting or reflecting other radiation appears within a certain spatial region. Thus, the activation of the motion detector can be restricted, for example, to the presence of adults who enter into the area of coverage of the sensor as a result of their body size whereas children cannot trigger the sensor because of their smaller size.

Especially suitable is a device which additionally has a picture recording system, for example, a camera or a CCD array which recognises a certain person and which is switched on when the motion detector, especially the infrared signal receiver, detects a moving source which emits and receives infrared signals.

For example, for the case of switching on an illumination on the household appliance a further development of the invention is especially advantageous in which the motion detector is operatively connected to a light sensor such that the signal of the motion detector only has an effect from a certain threshold of the ambient brightness or up to a certain threshold. The communication device or the illuminating means are then only switched on when the ambient brightness requires an additional artificial illumination of the display or of the area to be illuminated.

The light sensor can then also be provided for an inherently known intensity control of illuminants of the household appliance. This would save the additional application of measuring and control means for the ambient brightness.

In a networked household appliance which is fitted with the motion detection control system according to the invention, the device can be made such that the signal of the motion detector can be supplied to the communication network. Then, this signal can be used for further functions in the network. For example, the motion detector signal can be used for area monitoring in cooperation with alarm installations or it can trigger pre-determined switching measures, for example, switching on room lighting.

BRIEF DESCRIPTION OF THE DRAWING

Further advantageous embodiments of the invention are obtained from the following description where the invention is explained in detail with reference to an exemplary embodiment shown in the drawings. The drawing FIG. 1 shows in the single FIGURE a control panel of a household appliance, for example, a washing machine, with connections shown schematically to individual circuit assemblies of a block diagram.

DETAIL DESCRIPTION

The control panel 1 can be affixed in the usual manner to a washing machine which is not shown here and galvanically connected to the electrical equipment of the washing machine. This indicates the operative connections shown as single lines between the control panel 1 and the respective circuit assemblies. Attached to the control panel 1 are input elements in the form of rotary switches 2 and 3 and in the form of push-buttons 4 to 6. These input elements are mechanically connected internally such that electrical settings determined thereby can be accomplished on the assemblies 7 to 9.

Such settings are acknowledged on the control panel in a suitable fashion. Indicator lights 10 to 12 associated with the push-buttons 4 to 6 and indicator displays 13 and 14 associated with the rotary switches 2 and 3 are used for this purpose. The buttons 4 to 6 can, for example, be instantaneous switches and be provided to switch on or switch off certain types of processes. In washing machines these are, for example, "intensive wash", "extra rinse" and "crease resist". For this purpose the associated indicator lights 10, 11 or 12 must each light up so that the switched-on or switched-off state can be signalled to the user.

Associated with the rotary switch 2 is an indicator display 13 which for example displays a program name in clear script or a number associated with the program name. The rotary movement of the rotary switch 2 automatically triggers the associated display because the rotary switch is connected via the input signal circuit 9 to the central unit 15 which for its part transmits a certain signal from the information obtained from the input signal circuit 9 via the rotary switch position to a display image generator 16. This controls the indicator display 13 in a suitable fashion.

The signal formation and conversion from the rotary switch 3 via the input circuit 7, the central unit 15 and the display image generator 17 to the indicator display 14 proceeds in a corresponding fashion. In the example, this indicates a four-digit number for the set speed of a washing machine laundry drum in the spinning process.

The indicator lights 10 to 12 are controlled via the display image generator 18 in a corresponding fashion.

The control panel 1 also contains a combined infrared transmitter/receiver 19 which is directly connected to the central control unit 15 by means of an operative connection. This is constructed such that it continuously "lights up" the section of the room located in front of the household appliance with a minimum of power. In this case, the power is considerably lower than that of one of the indicator lights 10 to 12, not to mention the power input of the indicator display.

Now the display lighting can be completely switched off during operation of the household appliance and thus, in addition to saving energy, the corresponding display elements are also conserved.

If a user enters into the search beam of the infrared transmitter/receiver 19, this then reflects this search beam partly and in a variable fashion so that the evaluation logic of the infrared transmitter/receiver 19 not shown generates an output signal therefrom and passes it to the central unit 15. This central unit then again switches all the display elements 10 to 14 to active.

Should the infrared device 19 only consist of one receiver which is capable of recognizing the infrared radiation emitted by a person, the active search beams can be dispensed with whereby energy is again saved.

Alternatively to this, these search beams can also be emitted in fixed-cycle mode with a very high switch-off/on ratio so that when using active search beams, energy can be saved compared with continuous emission.

Whenever a movement is notified in the monitoring area, the indicators should be re-activated. They should then light up again for a switch-on time which is pre-set or which can be automatically adapted by comparison with the previous duration before switching on again.

In the case of an indicator light which indicates the stand-by mode of the control electronics (not shown here) before starting up the household appliance, the infrared motion detector can also be active. For this purpose, if a movement is detected in the monitoring area, the previously dark indicator light is switched to active for a duration which, according to experience, is sufficient for a control action to be carried out after detecting the movement. If this duration is exceeded, the indicator light then immediately goes out.

In a particularly advantageous fashion, the infrared transmitter/receiver 19 is equipped with a directional characteristic which ensures that only a certain room sector is always irradiated. For example, it can be avoided that the automatic switch-on of the communication devices is activated when children or pets approach the household appliance. For this purpose, the directional characteristic is constructed so that the lower area in front of the household appliance is not irradiated. This can be achieved by an optical system, e.g. by a lens arrangement and/or a diaphragm. In this case, such a diaphragm can also be set up as selectively transparent for infrared radiation.

A further advantageous embodiment of a household appliance provided with the motion detector according to the invention is provided by a light sensor which can switch on or switch off the motion detector or its operative connection to the controller from a certain brightness. At the same time, the light sensor can naturally also be used to control the radiation intensity of the illuminated displays or illuminations on the household appliance.

If the signal from the motion detector can be supplied via a suitable interface to an external communication network, the motion signal can be used for additional purposes. It can, for example, be used for intrusion detection monitoring in cooperation with intrusion detection installations. It can also be used for automatically switching room lighting. In this connection, all possibilities which are obtained in relation to area monitoring are open.

Since the motion sensor can also be used for switching to active input elements as communication devices and the selective area monitoring can also refrain from switching on the motion detector in the case of children, child proofing against unauthorised operation of the input elements can also be achieved with this device.

The invention claimed is:

1. An electrical household appliance adapted to receive physical goods and being operable to change the condition of the goods, the appliance comprising:
   a control device for controlling appliance functions;
   an operating device for inputting commands for controlling appliance functions by an operator, the commands concerning the change of condition to be performed on the goods;
   a display device for outputting program parameters relating to the appliance functions to a user; and
   a motion detector being operatively connected to the control device and to at least one of the operating device, the display device, and at least one of the operating device and the display device being switched to active on receiving a signal from the motion detector.

2. The household appliance according to claim 1, wherein the motion detector includes an infrared transmitter and receiver.

3. The household appliance according to claim 2, wherein the motion detector comprises a diaphragm which is selectively transparent to the infrared radiation.

4. The household appliance according to claim 1, wherein the motion detector includes a sensor reacting to signal changes.

5. The household appliance according to claim 1, wherein the signal from the motion detector activates a timer setting the switch-on time for at least one of the operating device, the display device, and the control device.

6. The household appliance according to claim 5, wherein the switch-on time of the timer is set when there is a combination of the motion detector signal and a usage action which is recorded within a pre-determined time after activation of the motion detector signal.

7. The household appliance according to claim 1, wherein the motion detector has a directional characteristic limiting a spatial area which can be detected by the motion detector.

8. The household appliance according to claim 7, wherein the spatial area which can be detected by the motion detector lies above a pre-determined height.

9. The household appliance according to claim 1, wherein the motion detector is operatively connected to a light sensor, the signal from the motion detector having an effect from at least one of a certain threshold of the ambient brightness and up to a certain threshold.

10. The household appliance according to claim 9, wherein the light sensor is provided at the same time for an inherently known intensity control of illuminants of the household appliance.

11. The household appliance according to claim 1 further comprising a device for networking the household appliance with an external communication network, the signal from the motion detector being supplied to the communication network.

12. An electrical household appliance adapted to receive physical goods and being operable to change the condition of the goods, the appliance comprising:
    a control unit controlling functions of the appliance;
    an input unit electrically connected to the control unit and receiving commands for controlling functions of the appliance from an operator, the commands concerning the change of condition to be performed on the goods;
    a display unit electrically connected to the control unit and having a lighted display displaying operating characteristics of the appliance, the display unit having an active condition, in which the lighted display is turned on, and an inactive state, in which the lighted display is turned off; and
    a motion detector electrically connected to the display unit, the motion detector providing a signal in response to detecting motion and the display unit being switched from the inactive condition to the active condition in response to receiving the signal from the motion detector.

13. The household appliance according to claim 12, wherein the motion detector includes an infrared transmitter and receiver, the motion detector emitting infrared search beams continuously to detect motion.

14. The household appliance according to claim 12, wherein the motion detector includes an infrared transmitter and receiver, the motion detector emitting infrared search beams intermittently in a fixed cycle to detect motion.

15. The household appliance according to claim 12, further comprising a timer electrically connected to the display unit and counting a pre-determined time period in response to receiving the signal from the motion detector, the display unit remaining in the active condition for the duration of the pre-determined time period.

16. The household appliance according to claim 12, further comprising a light sensor operatively connected to the motion detector and the display unit, the intensity control of the lighted display of the display unit being adjusted in response to the brightness of the light sensed by the light sensor.

17. A method for activating a display device for an electrical household appliance adapted to receive physical goods and being operable to change the condition of the goods, the appliance comprising a control unit, an input unit, and a motion detector, the display unit including a lighted display and having an active condition, in which the lighted display is turned on, and an inactive condition, in which the lighted display is turned off, the method comprising the acts of:
    controlling functions of the appliance with the control unit;
    receiving input commands from an operator with the input unit, the commands concerning the change of condition to be performed on the goods;
    sensing the presence of an operator with the motion detector in a spatial area near the appliance;
    providing a signal with the motion detector in response to sensing the presence of the operator; and
    switching the lighted display from the inactive condition to the active condition in response to the display unit receiving the signal from the motion detector.

18. The method according to claim 17, wherein the act of sensing the presence of an operator further comprises:
    emitting an infrared search beam from the motion detector;
    receiving the infrared search beam with the motion detector; and
    evaluating if the received search beam indicates motion in the spatial area.

19. The method according to claim 17, wherein the act of sensing the presence of an operator further comprises limiting the spatial area to an area above a pre-determined height.

20. The method according to claim 17, further comprising the acts of:
    providing a timer operatively connected to the display unit;
    counting a pre-determined time period with the timer in response to receiving the signal from the motion detector; and
    maintaining the display unit in the active condition for the duration of the pre-determined time period.

* * * * *